US012612786B2

(12) United States Patent
Flann

(10) Patent No.: US 12,612,786 B2
(45) Date of Patent: Apr. 28, 2026

(54) SHADING APPARATUS WITH PANELS

(71) Applicant: SUNCATCHER, LLC, Smithfield, UT (US)

(72) Inventor: Nicholas Flann, Smithfield, UT (US)

(73) Assignee: SUNCATCHER, LLC, Smithfield, UT (US)

( * ) Notice: Subject to any disclaimer, the term of this patent is extended or adjusted under 35 U.S.C. 154(b) by 237 days.

(21) Appl. No.: 18/228,290

(22) Filed: Jul. 31, 2023

(65) Prior Publication Data

US 2024/0035284 A1 Feb. 1, 2024

Related U.S. Application Data

(60) Provisional application No. 63/394,033, filed on Aug. 1, 2022.

(51) Int. Cl.
*E04F 10/08* (2006.01)
*H02S 20/30* (2014.01)

(52) U.S. Cl.
CPC .............. *E04F 10/08* (2013.01); *H02S 20/30* (2014.12)

(58) Field of Classification Search
CPC ........................................................ E04F 10/08
See application file for complete search history.

(56) References Cited

U.S. PATENT DOCUMENTS 2,877,827 A * 3/1959 Anderson .............. A47B 11/00
297/158.3
3,784,250 A * 1/1974 Beeman ................. A45B 17/00
297/184.1
4,649,899 A 3/1987 Moore
5,255,954 A * 10/1993 Rogers ................... A45B 11/00
135/96
5,857,741 A * 1/1999 Anderson .............. A47B 83/02
224/521
6,396,239 B1 * 5/2002 Benn ..................... H01M 50/24
320/101

(Continued)

FOREIGN PATENT DOCUMENTS

CN 206626521 U 11/2017
DE 202011105918 U 11/2011

(Continued)

OTHER PUBLICATIONS

Fixedfocus, IBeSdzHqSyg_NPL, Solar Panel Rotation System, http://www.youtube.com/watch?v=IBeSdzHqSyg, Mar. 23, 2023, US.

(Continued)

*Primary Examiner* — Joshua K Ihezie
(74) *Attorney, Agent, or Firm* — Preston P. Frischknecht; Project CIP

(57) ABSTRACT

A shading apparatus with panels, such as, for example solar panels, connected to a spindle assembly rotatable about a vertical axis. Two or more panels are arranged in a series and connected to the spindle assembly and each panel is rotatable on a horizontal-longitudinal axis and form an array configured to provide a shade canopy. Certain embodiments include a payload area, such as, for example, a seating platform which may be either affixed or releasably attachable to the spindle assembly and/or central pole and rotatable about the vertical axis as a carousel.

10 Claims, 9 Drawing Sheets

(56) References Cited

U.S. PATENT DOCUMENTS

| | | | | |
|---|---|---|---|---|
| 7,230,819 | B2 * | 6/2007 | Muchow | F24S 25/70 |
| | | | | 361/825 |
| 8,119,963 | B2 * | 2/2012 | Scanlon | F24S 30/455 |
| | | | | 250/203.4 |
| 8,308,123 | B1 * | 11/2012 | Accordino | A45B 23/00 |
| | | | | 248/220.21 |
| D783,521 | S * | 4/2017 | Negley | H02S 20/22 |
| | | | | D13/102 |
| 10,059,407 | B1 * | 8/2018 | Ingalls | B63B 17/02 |
| 10,447,198 | B2 * | 10/2019 | Mori | F24S 25/63 |
| 10,772,401 | B2 * | 9/2020 | Akin | B23P 15/26 |
| 11,001,313 | B2 * | 5/2021 | Turner | A45B 23/00 |
| 11,242,952 | B1 | 2/2022 | Bayoumi | |
| D969,068 | S * | 11/2022 | Dunn | D13/102 |
| D1,005,934 | S * | 11/2023 | Dunn | D13/102 |
| 2005/0241546 | A1 * | 11/2005 | Royse | A47B 37/04 |
| | | | | 224/521 |
| 2010/0101559 | A1 * | 4/2010 | Grant | H02S 20/10 |
| | | | | 126/600 |
| 2013/0192659 | A1 | 8/2013 | Upton et al. | |
| 2017/0025989 | A1 | 1/2017 | Shaw | |
| 2021/0194417 | A1 * | 6/2021 | Sharpe | G05D 3/105 |
| 2022/0356712 | A1 * | 11/2022 | Flann | H02S 20/10 |
| 2024/0035284 | A1 * | 2/2024 | Flann | E04F 10/08 |

FOREIGN PATENT DOCUMENTS

| | | |
|---|---|---|
| WO | WO2013020562 | 2/2013 |
| WO | WO2022059001 | 3/2022 |

OTHER PUBLICATIONS

Aboubakr El Hammoumi et al., ese3236_NPL, A Simple and Low-Cost Active Dual-Axis Solar Tracker, http://onlinelibrary.wiley.com/doi/full/10.1002/ese3.236, Sep. 23, 2018, Abstract, pp. 609-610, p. 609, US.

* cited by examiner

SHADING APPARATUS WITH PANELS

BACKGROUND OF THE INVENTION

Millions of acres of outdoor space are poorly utilized because they cannot be comfortably or beneficially put to use. Shade makes space useful. In this age of heat domes, record temperatures, and remote work, the need for shade has never been greater. Yet, current shade devices have many disadvantages. For example, current shade devices typically give only partial shade, particularly as the sun moves across the sky over a period of time. While many shade devices have means for adjusting and/or repositioning as the sun moves, this process is cumbersome and repetitive. Furthermore, most devices incorporate traditional umbrella-style configurations with sail-like canopies that are highly susceptible to wind load in outdoor spaces. Such designs are dangerous because they may lead to property damage or even personal injury in high wind situations.

Separately, environmental concerns and technological and material advances have increased the awareness in the fields of personal energy production and self-reliance. In particular, people increasingly incorporate solar panels on their residences and use solar energy in other applications. Where shade devices are deployed, there is also an opportunity for solar energy production. While some solar energy producing shade devices exist in the prior art, these devices still share many of the above-mentioned disadvantages of traditional designs, including partial shading problems and wind-load susceptibility.

Also, for applications that attempt to provide shade around an outdoor table over time, current umbrella designs are largely inadequate because providing shade over time requires and/or assumes that the table must be kept fixed in space.

In light of the above, a new shading device is needed to solve the problems of providing full shade over time, reducing wind load, and maintaining an option for personal solar energy production.

SUMMARY OF THE INVENTION

In accordance with the above, a new and innovative shading apparatus with panels is provided. The problems of providing shade over time, reducing wind load, and maintaining an option for personal solar energy production in a shading device are solved. In particular, the invention relaxes the shading problem, in part, by allowing the shading volume (and table in certain embodiments) to rotate about a vertical axis. Embodiments include a shading apparatus with panels comprising: a spindle assembly rotatable about a vertical axis; and two or more panels arranged in a series and connected to the spindle assembly, each panel rotatable on a horizontal-longitudinal axis, wherein the panels form an array configured to provide a shade canopy. Panels may be solar panels. Certain embodiments include a payload area, such as, for example, a seating platform, which may be either affixed or releasably attachable to, the spindle assembly and also rotatable about the vertical axis.

These and other aspects of the present invention will become more fully apparent from the following description and appended claim or may be learned by the practice of the invention as set forth hereinafter.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

Figure 1:
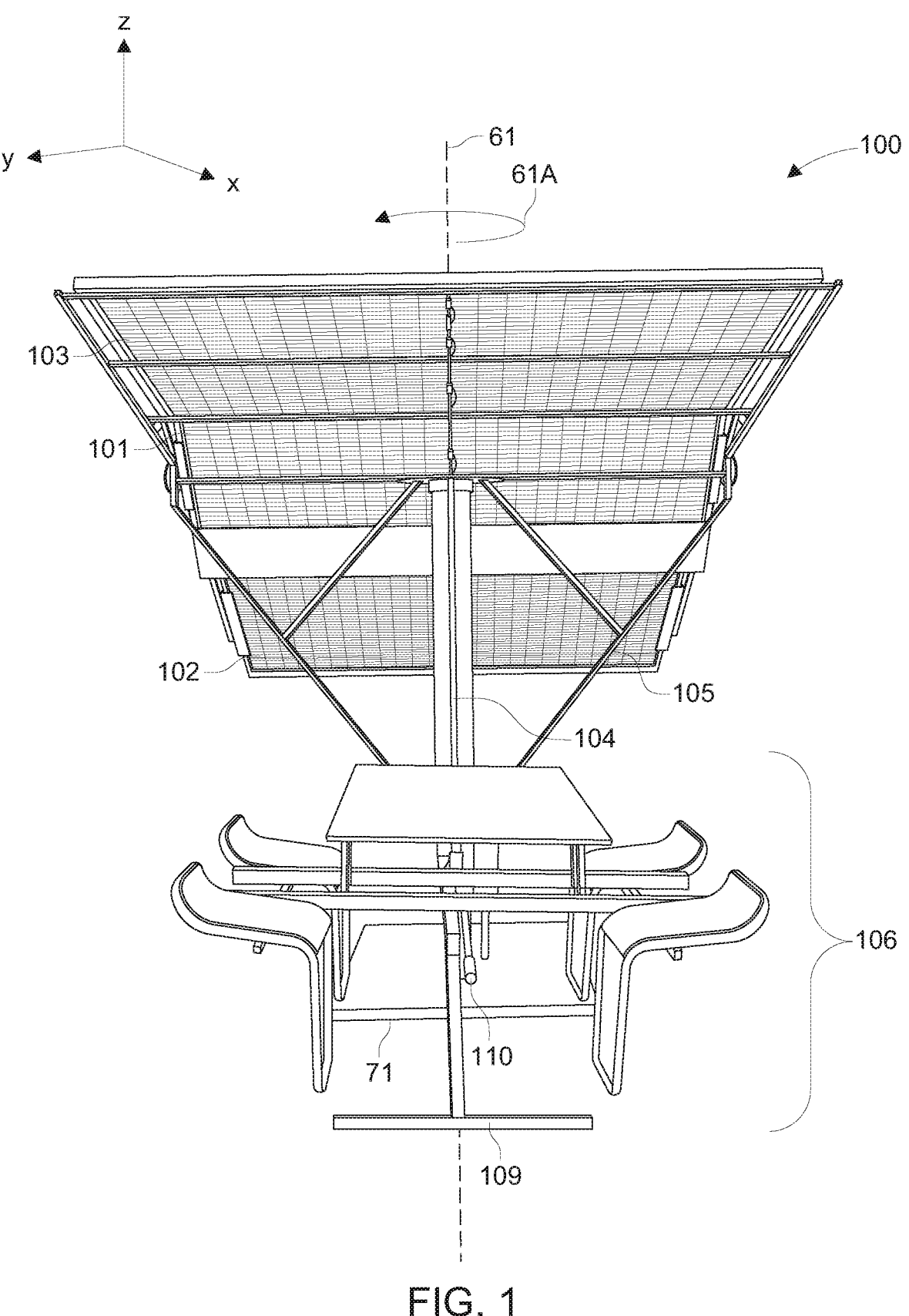
FIG. 1 is back view of a first embodiment of a shading apparatus with panels.
Figure 2:
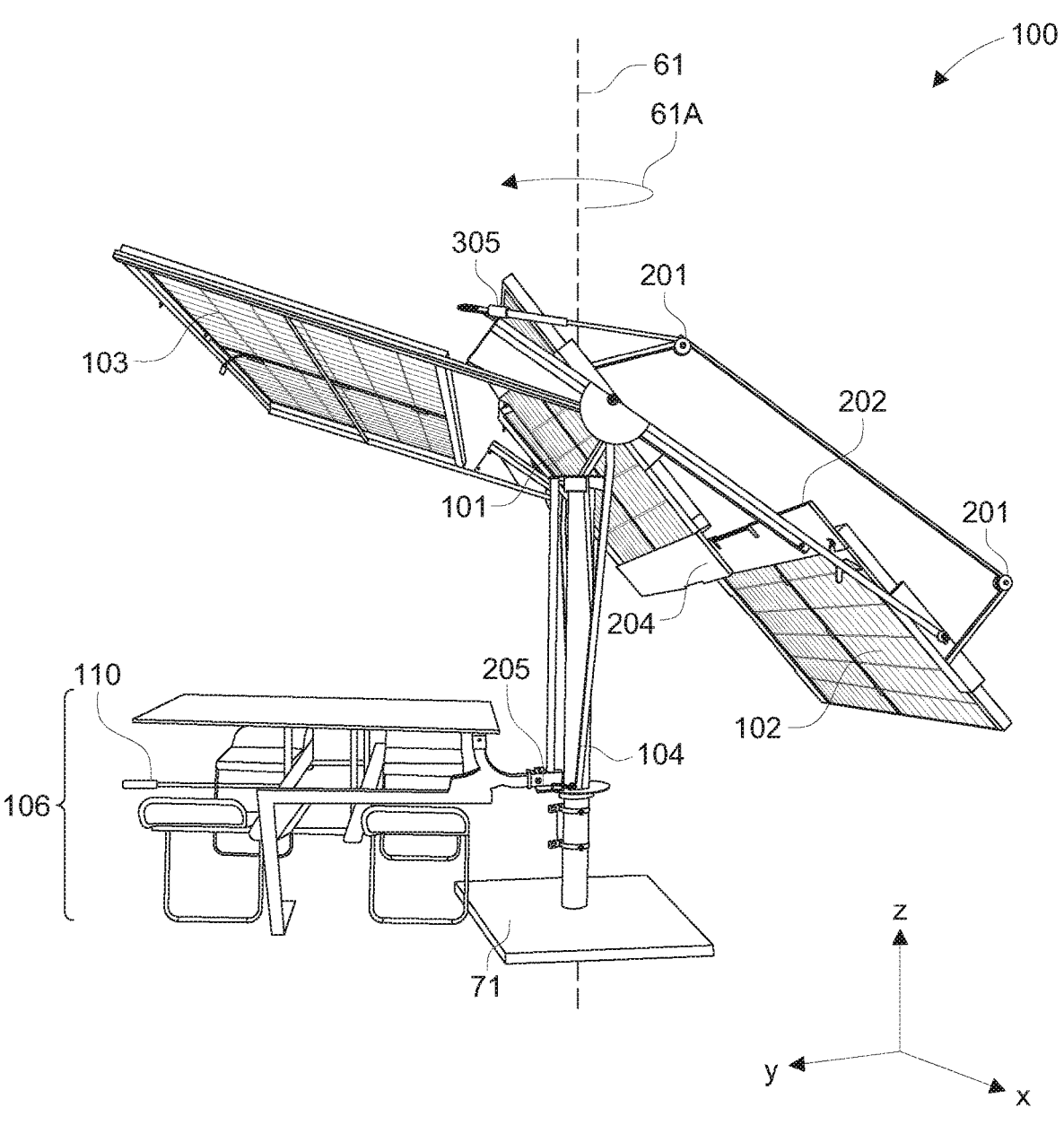
FIG. 2 is a side view of a first embodiment of a shading apparatus with panels in a first position.
Figure 3:
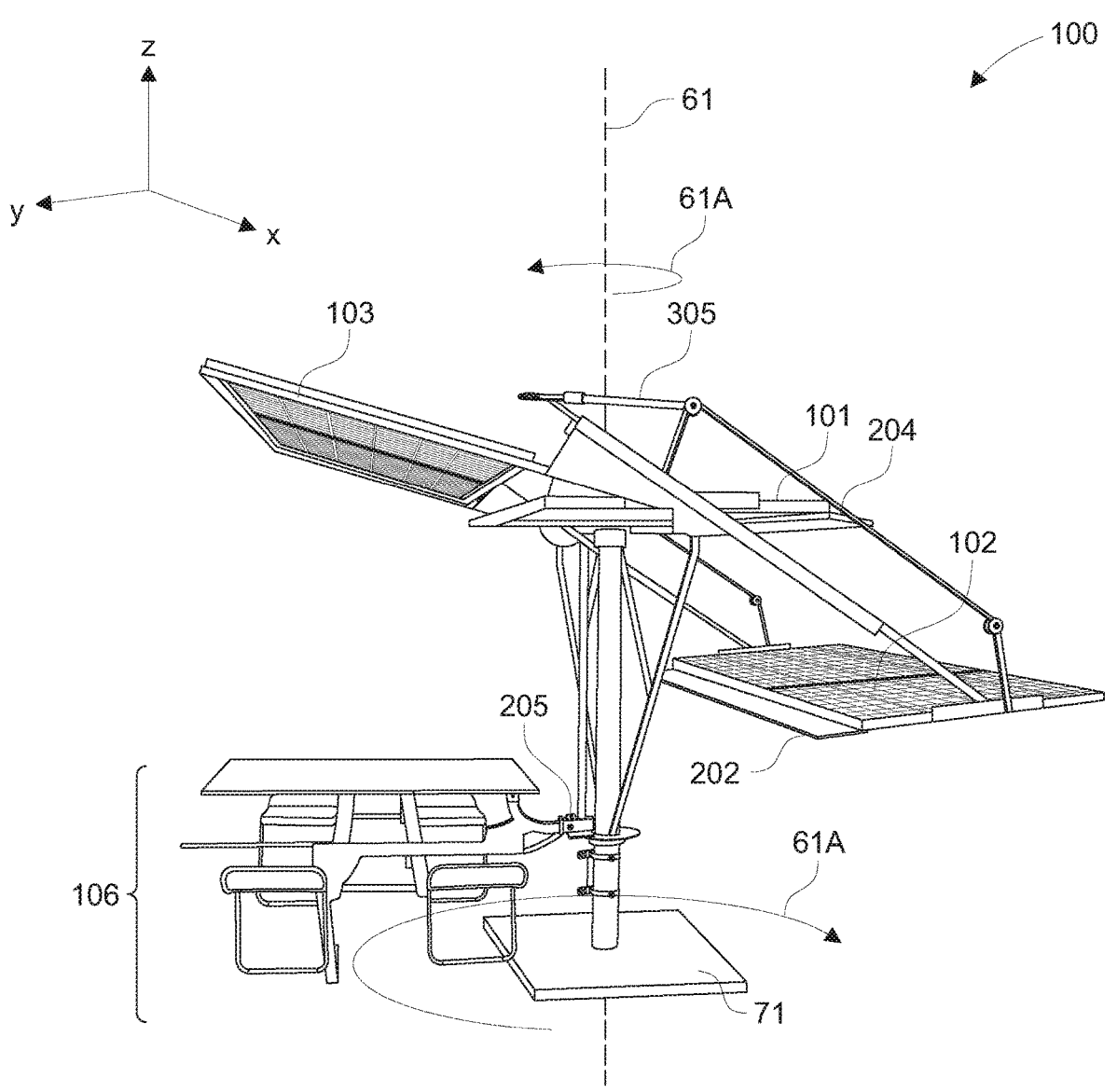
FIG. 3 is a side view of a first embodiment of a shading apparatus with panels in a second position.
Figure 4:
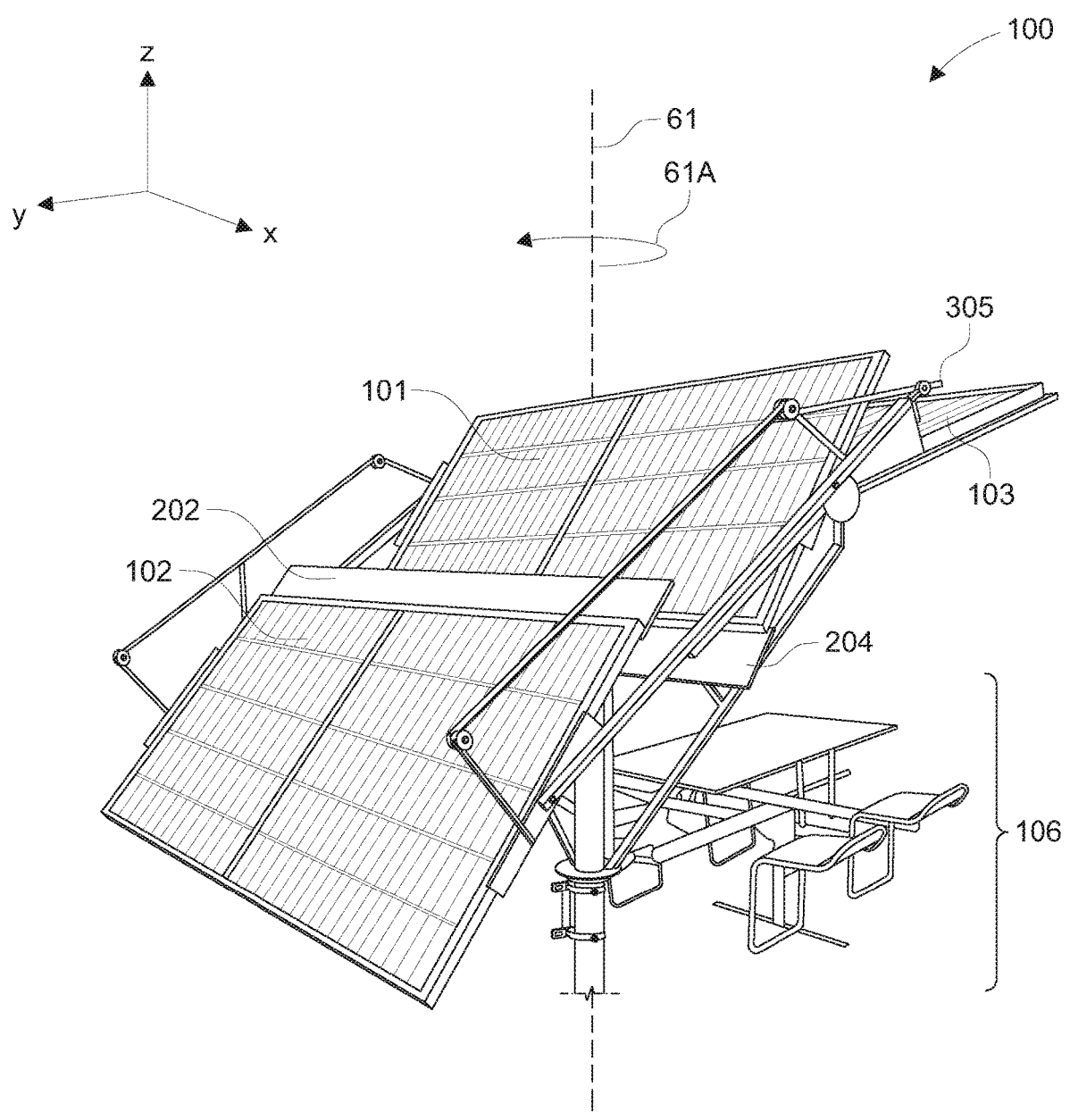
FIG. 4 is a front perspective view of a first embodiment of a shading apparatus with panels.
Figure 5:
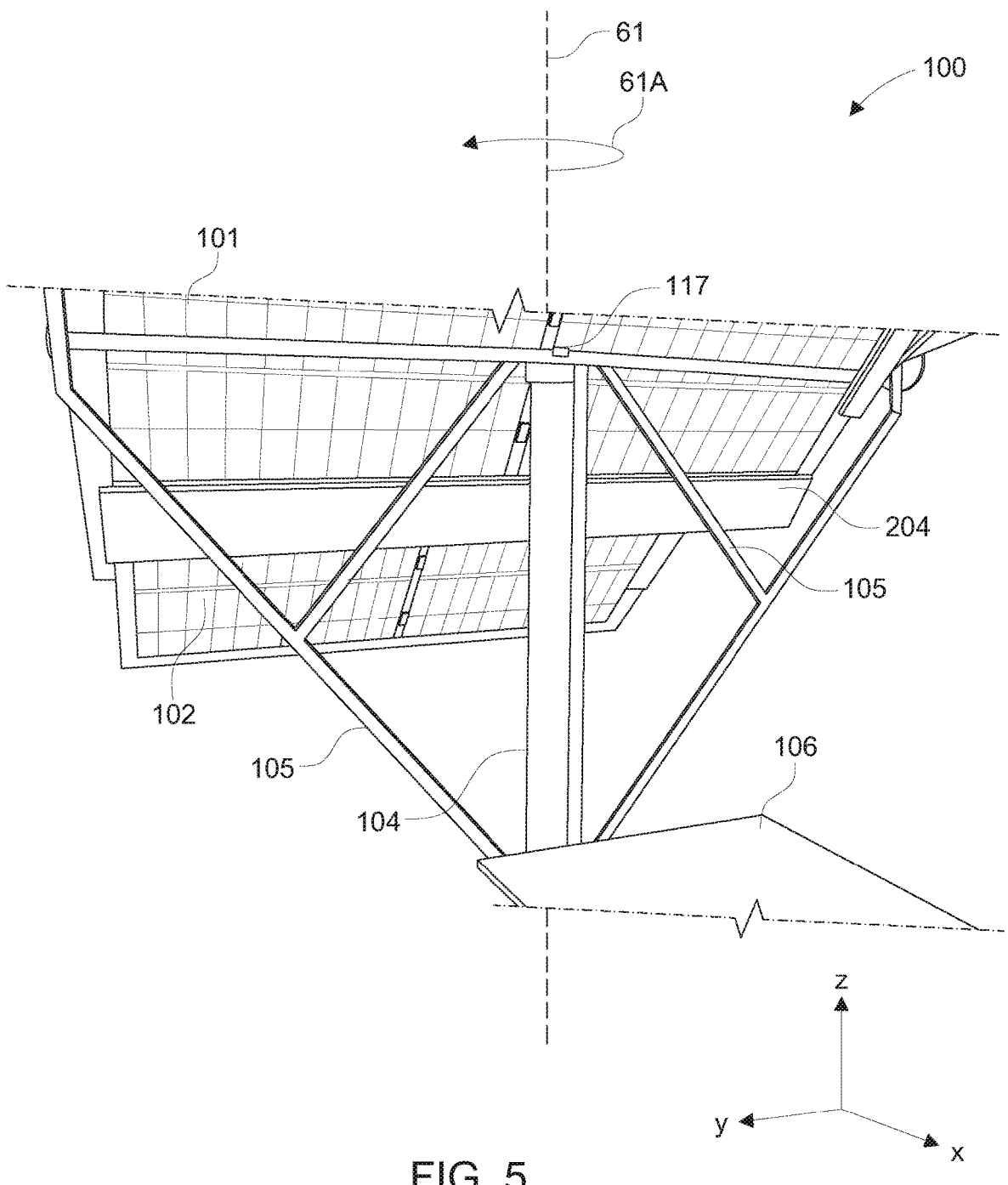
FIG. 5 is a perspective view of a portion of a first embodiment of a shading apparatus with panels.
Figure 6:
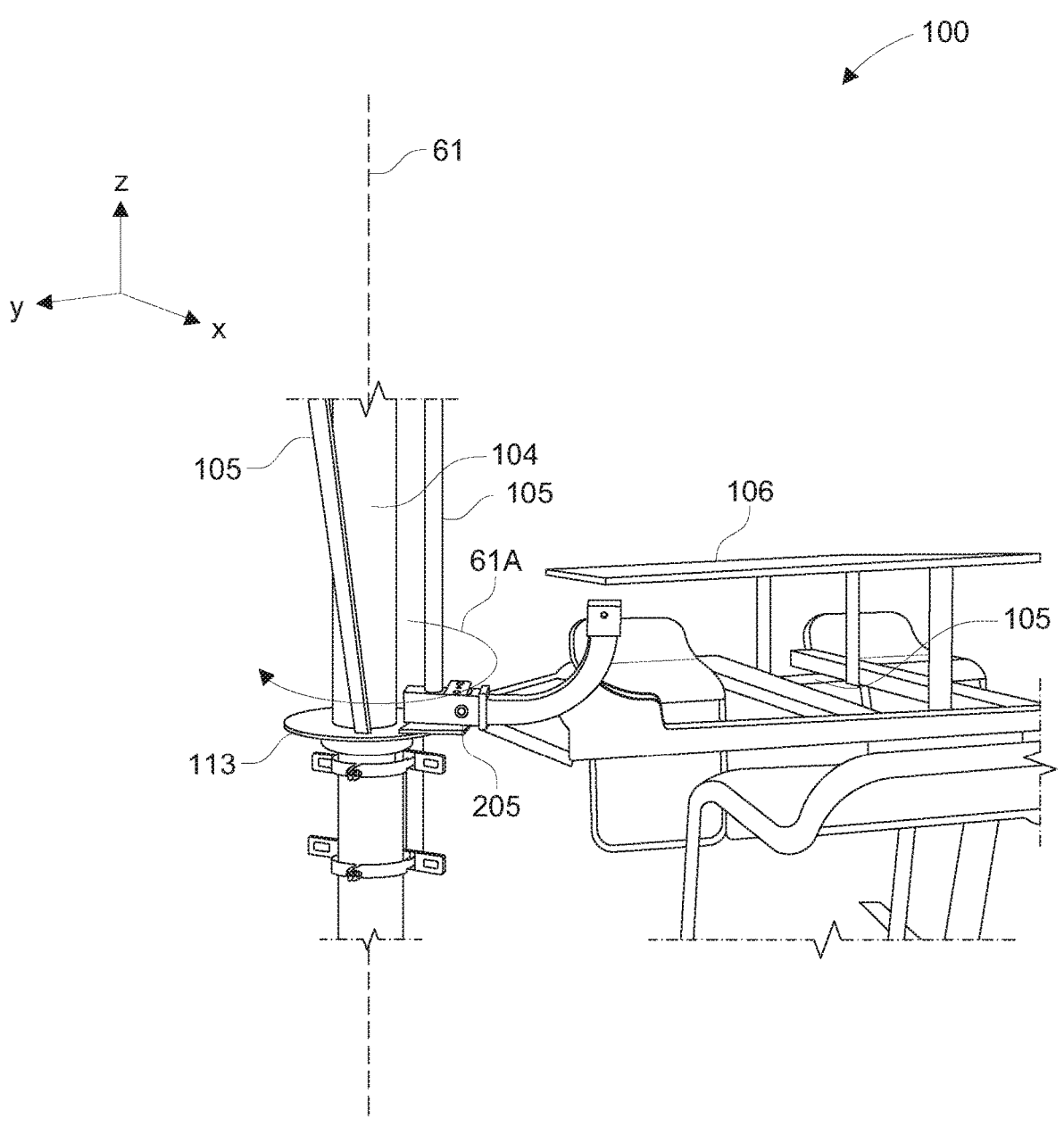
FIG. 6 is a side view of a portion of a first embodiment of a shading apparatus with panels.

The present invention in its various embodiments, some of which are depicted in the figures herein, is a shading apparatus with panels.

Referring now to FIGS. 1-6, a first exemplary embodiment of a shading apparatus with panels 100 is shown. In the illustrated embodiment, panels are solar for generating electricity. However, any generally planar surface may be used as a panel without departing from the purposes and scope of the invention. In the illustrated embodiment, the shading apparatus with panels 100 is comprised of a panel array comprised of two or more panels adjacent each other or in a series. The panel array is specifically configured to create shade beneath the shading apparatus as desired and described in more detail below.

In the illustrated embodiment, first 101 and second 102 panels are arranged in series and adjacent each other at long edges. Each of first 101 and second 102 panels are rotatable about a horizontal axis that is generally parallel to the ground and which corresponds to a longitudinal axis of the panel. So configured, the first 101 and second 102 panels are positionable in elevation and/or orthogonally with respect to the sun. In various embodiments, positioning may be assisted by powered means, such as one or more linear actuators that are connected to and controllable by one or more controllers, and attached to panels through, for example, a pivotable assembly 201.

In various embodiments, panel array may also include additional horizontally rotatable and/or fixed panels. For example, in the illustrated embodiment of FIGS. 1-6, panel array includes a third, angled fixed panel 103 located proximal to the first panel 101 and distal to the second 102 panel, the first 101, second 102, and third 103 panels all in a series.

Panels may incorporate one or more extensions 202, 203, 204, between them and/or at distal ends. In a second embodiment, shown in FIGS. 7 and 8, one or more extensions 703 may be fixedly (non-rotatable) attached between panels.

Across embodiments, panels are offset resulting in panel depth sub-tiers. By adopting a multiple, off-set panel configuration, the shading apparatus with panels minimizes wind load, particularly in comparison to other shading designs and configurations. Moreover, the spatial arrangement of the panels minimizes intra-panel shading and/or overlap while maximizing shade volume given fixed and/or standard sized panels.

In one or more first positions, the panels of the first and second panels of the array are generally orthogonal to a point corresponding to a intermediate-to-low horizon sun position. In a second position, first and second panels are generally horizontal corresponding to a highest sun position and/or optimized for minimizing crosswind resistance, in part, through minimal cross section structure. Other embodiments may incorporate other positionable functionality and/or configuration. For example, in some embodiments, the panels may be configured to collect and/or channel precipitation.

The panel array is attached to and generally positioned above a spindle assembly that rotates about a vertical axis 61. Spindle assembly may be comprised of a vertical central post 104 and spindle framework 105. The spindle assembly imparts rotation to the panel array, thereby allowing the panel array to be positioned in azimuth. In various embodiments, positioning may be assisted by powered means, such as an actuator, and connected/controllable through one or more controllers.

Across embodiments, the shading apparatus with panels may also include a releasable attachment means 205 for attaching accessories to the spindle assembly. For example, FIGS. 1-6 show a releasable attachment means comprised of a receiver hitch. The receiver hitch is connected to a table with seats 106, the latter of which may also be connected together as a single assembly. The table with seats 106 has a handle 110 by which the table with seats 106 may be pivoted vertically and/or used to rotate and/or horizontally reposition the spindle assembly and panel array.

Figure 7:
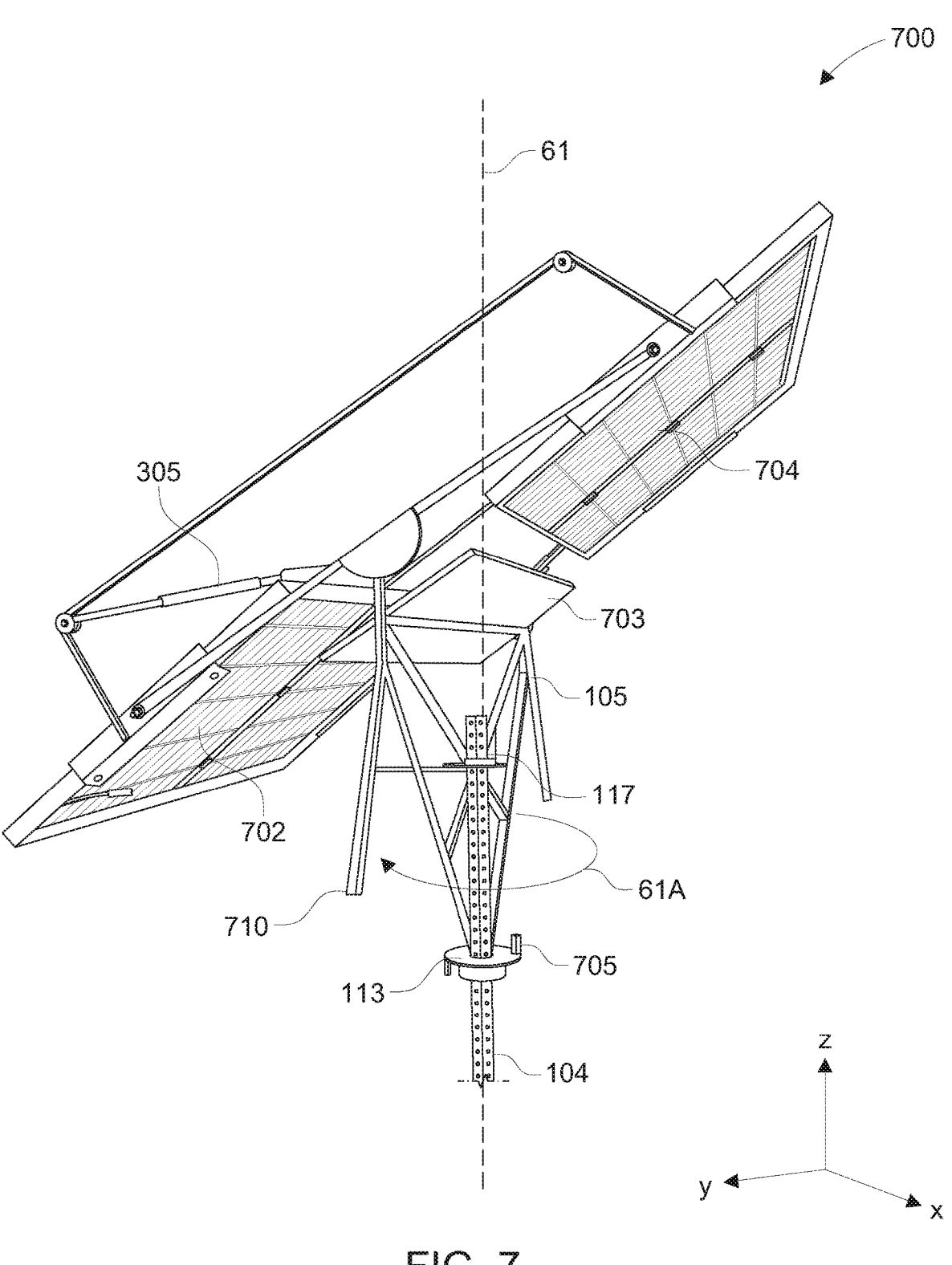
FIG. 7 is a side view of a second embodiment of a shading apparatus with panels in a first position.
Figure 8:
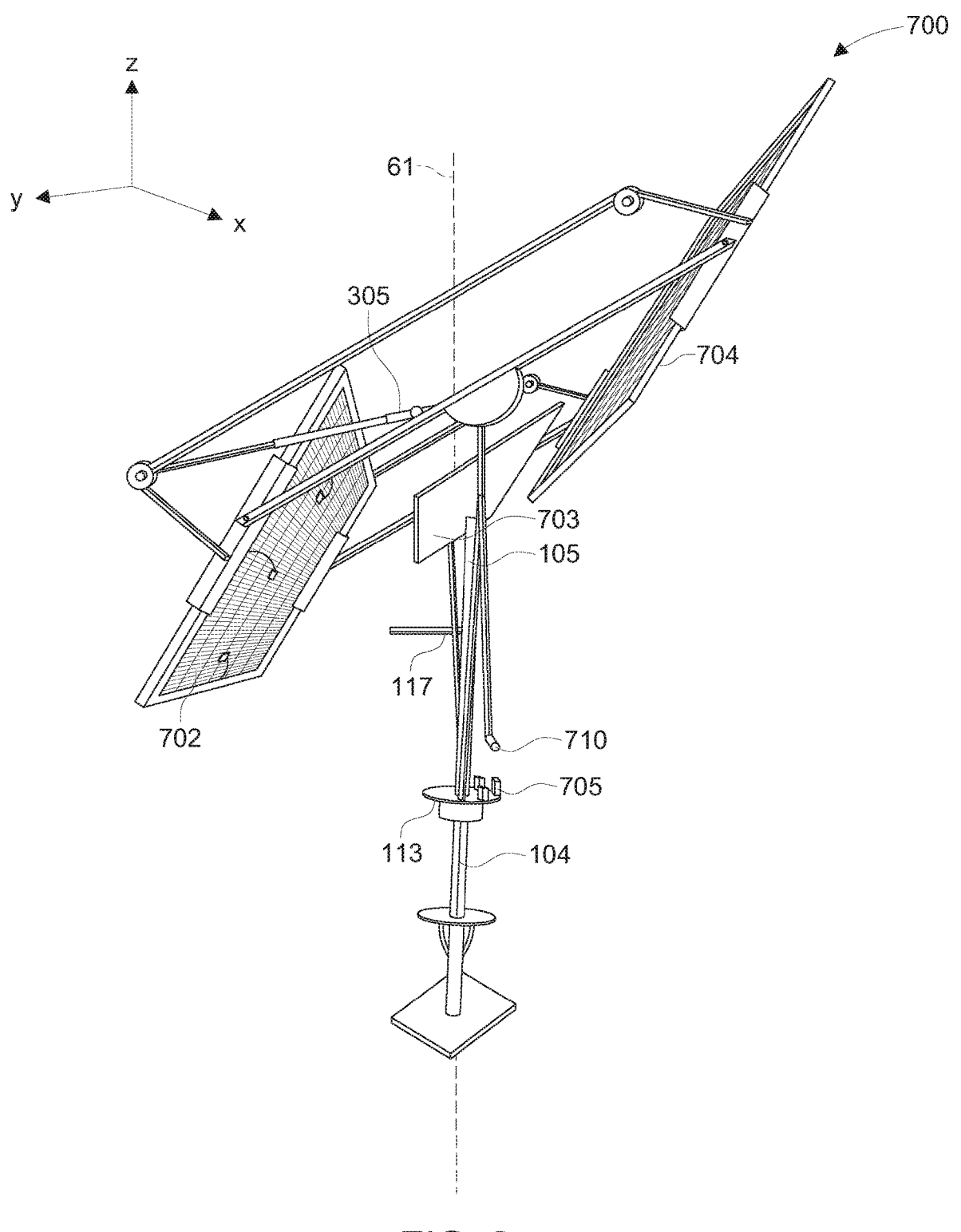
FIG. 8 is a side view of a second embodiment of a shading apparatus with panels in a second position.

Referring now to FIGS. 7-8, a second exemplary embodiment of a shading apparatus with panels 700 is shown. In the illustrated embodiment, first 704 and second 702 panels are arranged in series and adjacent each other at long edges. Each of first 704 and second 702 panels are rotatable about a horizontal axis that is generally parallel to the ground and which corresponds to a longitudinal axis of the panel. So configured, the first 704 and second 702 panels are positionable in elevation and/or orthogonally with respect to the sun. In various embodiments, positioning may be assisted by powered means, such as one or more linear actuators that are connected to and controllable by one or more controllers, and attached to panels through, for example, a pivotable assembly. Panels may incorporate one or more extensions 703 between them and/or at distal ends.

Figure 9:
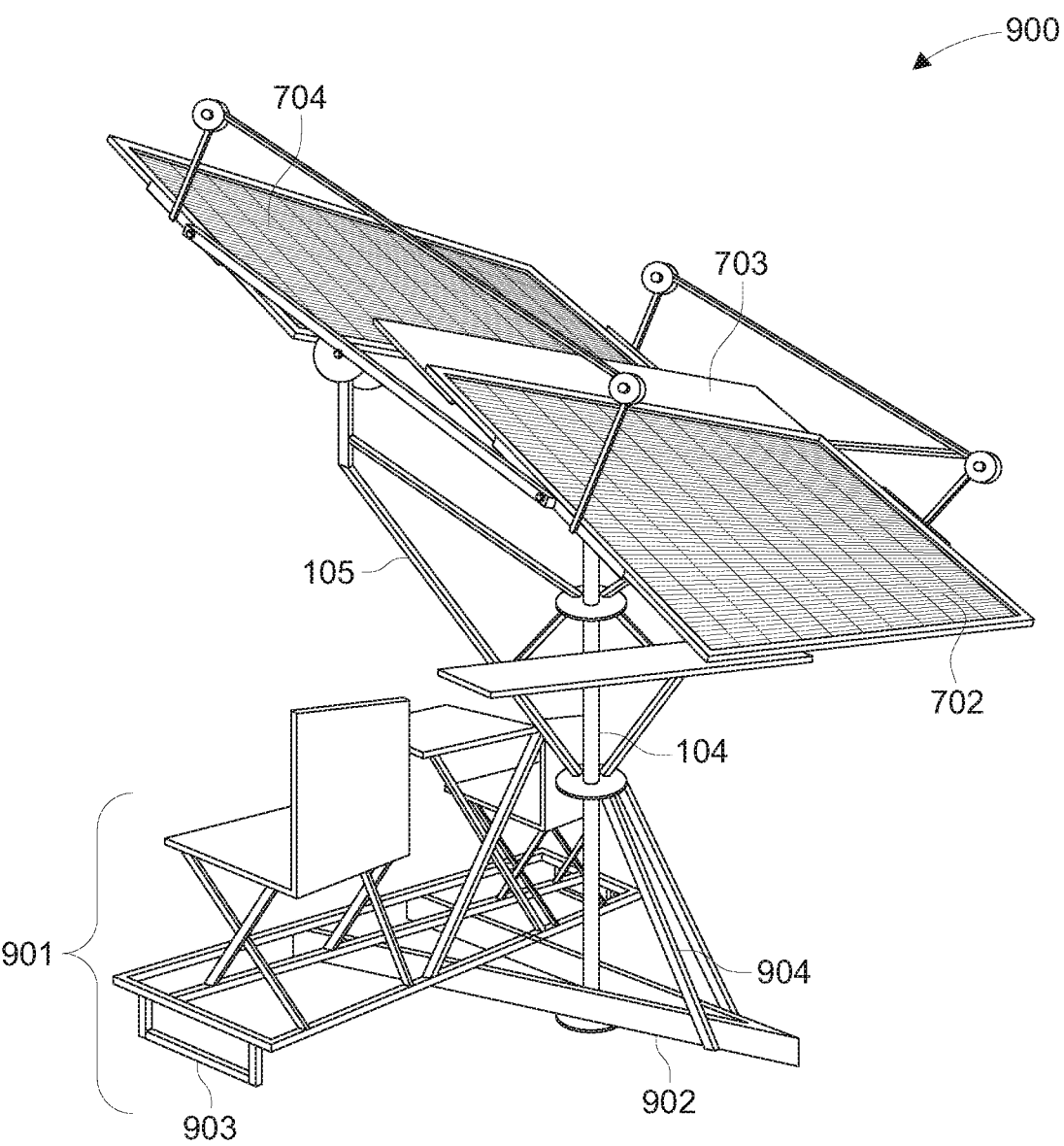
FIG. 9 is a front perspective view of a third embodiment of a shading apparatus with panels.

Referring now to FIG. 9, a third exemplary embodiment of a shading apparatus with panels 900 is shown. The embodiment of FIG. 9 also includes a payload area and/or platform, and specifically a table with seats on a seating platform 901. Seating platform 901 may be comprised of one or more base/first spindle connection members 902, a platform portion 903 and support/second spindle connection members 904. The seating platform 901 is connected to the spindle assembly and/or vertical pole 104 and also configured to rotate about the vertical axis 61 as a carousel.

Positioning means vary across embodiments. For example, in one version, the shading apparatus with panels may be azimuth-positioned manually, for example, by a user hand-rotating the spindle assembly, including by using a handle or similar means located adjacent the spindle assembly. Such a version may also be elevation-positioned via the linear actuator through direct and/or remote control, with corresponding user interfaces for accomplishing the same.

In another version, the shading apparatus with panels may incorporate electromagnetic actuators, which, together with the linear actuator, utilize control logic with one or more of: direct and/or remote motor control, an onboard computer with software; onboard hardware with firmware; downloadable computer application software for mobile devices and the like; and/or temporary online non-downloadable software, with corresponding user interfaces. Software and/or firmware may have instructions for moving and/or positioning the shading apparatus with panels according to various modes. Such modes may include: a first mode wherein a user may orient the first panel array towards a desired altitude angle; a second mode wherein a user may orient the first panel array towards a desired azimuth; a third mode wherein the first panel array orients orthogonal to the sun over a period of time; a fourth mode wherein the first panel array moves to a position whereby each panel of the plurality of panels is generally horizontal and/or optimized to reduce wind load; a fifth mode wherein the first panel array is configured to collect and/or channel rainwater; and a sixth mode wherein the first panel array is configured to move away from an assigned location.

Examples of the functionality imparted to the above-described structure by software instructions are further provided. For example, in the third mode, software instructions in combination with the structure create continuous shade all day as a volume underneath the shading apparatus with panels by positionally adjusting the panel arrays as the sun moves across the sky. Each panel may be configured orthogonally to the sun's current position by rotating one or more panels in azimuth and in altitude through actuation of linear motor. Automatic control may be achieved by software actively tracking the position of the sun based on the local time and latitude and longitude of the deployed location. At time intervals during the day, an automatic controller may wake up and actuate the motors to reconfigure the shading apparatus with panels to minimize a misalignment caused by the Earth's rotation since the previous adjustment.

In another example, in the fourth mode, software instructions in combination with the structure place the apparatus in a wind-safe configuration with each panel exactly horizontal, minimizing resistance to winds running parallel to the ground. Software instructs linear motor to move panels to horizontal. There may be no need to adjust the AZ configuration because minimal area is presented independent of wind direction. This mode may be entered automatically by software reacting to local wind speed measurements obtained through sensors or through weather reports/forecasts read from the internet.

In another example, the appropriate azimuth and altitude to operate in the fifth mode depend upon the integration of water collection and containment apparatus onto the panels and spindle. In one embodiment, panels may be configured to be held horizontal as in the fourth mode, yet offer a slight gradient to water collecting on their surface to collect towards a desired location. This mode may be entered automatically by software reacting to local precipitation measurements obtained through sensors or through weather reports/forecasts read from the internet.

In another example, the sixth mode where the panels are lifted up and away from the central post and shade volume is important to allow free access to the space if needed, such as in agribusiness. Software may control this automatically through proximity sensors or direct commands from a user interface.

Embodiments of the shading apparatus with panels may include other features and/or configurations. For example, the shading apparatus with panels may be configured as a patio accessory (with a table, etc). In another example, the shading apparatus with panels may be configured as a guzzler, trough, or other water supply. In yet another example, the shading apparatus with panels may be configured for animal and/or pet shading. In various embodiments, the shading apparatus may be configured as a disassembled kit and/or parts easily fitted into a box and/or shipping container for transport. Consequently, various methods of assembly and/or installation are contemplated. Shading apparatus with panels may include a battery for collecting energy from solar panels, a power supply, controls, and/or user interface.

So configured, the shading apparatus with panels solves the problems of providing shade over time, reducing wind load, and maintaining an option for personal solar energy production in a shading device. The problem of requiring a fixed location shaded space is relaxed by allowing the contiguous volume to rotate about an AZ axle. Place the volume "down-sun" of a configuration of individual panels that provide contiguous shade. When rotated to face the sun, maximal shade is maintained over a large area situated within the shadow of the panel assembly. The relaxed problem posed easier to solve. Little is given up because the Earth spins so slowly, few distinct rotations are required per day to maintain the quality shade.

The present invention may be embodied in other specific forms without departing from its spirit or essential characteristics. For example, the illustrated embodiments generally show two or three panel arrays. However, any number of panels (fewer or more) may be used in the invention. In another example, the illustrated embodiments show panel positions at specific degrees above the horizon. However, embodiments may vary in their degrees and/or degree ranges from those specified. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A shading apparatus with solar panels comprising:
a spindle assembly rotatable about a vertical post with a vertical axis; and
three or more solar panels in a row connected to the spindle assembly, a first solar panel rotatable about a first horizontal axis a second solar panel rotatable about a second horizontal axis, and a third solar panel located at an end of the row and fixed at an angle;
a payload platform connected to the spindle assembly generally below the two or more panels and rotatable about the vertical axis; and
wherein all of the solar panels of the shading apparatus form a single row and are configured to provide a shade canopy for the payload platform.

2. The shading apparatus with solar panels of claim 1, wherein the payload platform is releasably attachable to the spindle assembly.

3. The shading apparatus with solar panels of claim 1, further comprising a linkage attached to the two or more solar panels and configured to rotate each of the first and second panels on its respective horizontal axis.

4. The shading apparatus with solar panels of claim 1, further comprising a frame, the two or more solar panels generally located within the frame.

5. The shading apparatus with panels of claim 1, further comprising a sub-panel along the edge of a solar panel configured to bridge a gap between solar panels.

6. The shading apparatus with solar panels of claim 1, further comprising a linear actuator connected to a linkage for moving the two or more solar panels.

7. The shading apparatus of claim 6, further comprising a control unit having control modes configured to operate the shading apparatus with solar panels in one or more of the following modes:
a first mode wherein a user may orient solar panels towards a desired altitude angle;
a second mode wherein a user may orient solar panels towards a desired azimuth;
a third mode wherein solar panels orient orthogonal to the sun over a period of time;
a fourth mode wherein solar panels move to a position whereby each solar panel is generally horizontal;
a fifth mode wherein solar panels are configured to collect rainwater;
a sixth mode wherein solar panels are configured to move away from an assigned location.

8. A shading apparatus with solar panels comprising:
a spindle assembly rotatable about vertical post with a vertical axis;
a frame attached to the spindle assembly;
three or more solar panels connected to the spindle assembly, generally within the frame, wherein
a first solar panel is rotatable about a first horizontal axis and configured to move to a generally horizontal position,
a second solar panel is rotatable about a second horizontal axis and configured to move to a generally horizontal position, and
a third solar panel is located at an end of the row and is fixed at an angle;
one or more sub-panels along the edge of one or more of the first and second solar panels that is configured to bridge a gap between the first and second solar panels;
a linkage attached to the first and second solar panels and configured to rotate the first and second solar panels on their respective horizontal axes;
a releasably attachable seating platform connected to the spindle assembly generally below the three or more solar panels and rotatable about the vertical axis; and
wherein all of the solar panels of the shading apparatus form a single tiered row and are configured to provide a shade canopy for the seating platform.

9. The shading apparatus with solar panels of claim 8, further comprising a linear actuator connected to the linkage for moving solar panels.

10. The shading apparatus of claim 9, further comprising a control unit having control modes configured to operate the shading apparatus with solar panels in one or more of the following modes:
a first mode wherein a user may orient solar panels towards a desired altitude angle;
a second mode wherein a user may orient solar panels towards a desired azimuth;
a third mode wherein solar panels orient orthogonal to the sun over a period of time;

a fourth mode wherein solar panels move to a generally
  horizontal position;
a fifth mode wherein solar panels are configured to collect
  rainwater;
a sixth mode wherein solar panels are configured to move
  away from an assigned location.

* * * * *